United States Patent
Kim et al.

(10) Patent No.: US 10,162,871 B2
(45) Date of Patent: Dec. 25, 2018

(54) CLOUD COMPUTING SYSTEM AND DATA SYNCHRONIZATION METHOD

(71) Applicant: SK Telecom Co., Ltd., Seoul (KR)

(72) Inventors: Seung Min Kim, Seoul (KR); Jong Pil Youn, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1008 days.

(21) Appl. No.: 13/871,761

(22) Filed: Apr. 26, 2013

(65) Prior Publication Data

US 2013/0238553 A1    Sep. 12, 2013

Related U.S. Application Data

(63) Continuation of application No. PCT/KR2011/008165, filed on Oct. 28, 2011.

(30) Foreign Application Priority Data

Oct. 28, 2010 (KR) .................. 10-2010-0105881
Dec. 27, 2010 (KR) .................. 10-2010-0135673

(51) Int. Cl.
G06F 17/30 (2006.01)
G06F 11/14 (2006.01)
G06F 11/20 (2006.01)

(52) U.S. Cl.
CPC ........ G06F 17/30575 (2013.01); G06F 11/14 (2013.01); G06F 11/1402 (2013.01); G06F 11/2094 (2013.01); G06F 11/2097 (2013.01)

(58) Field of Classification Search
CPC ............. G06F 11/1662; G06F 9/45558; G06F 17/30575; G06F 11/14; G06F 11/1402; G06F 11/2094; G06F 11/2097

(Continued)

(56) References Cited

U.S. PATENT DOCUMENTS 7,260,590 B1 * 8/2007 Williams ............ G06F 11/1464
                                                                707/615
8,156,301 B1 * 4/2012 Khandelwal ........ G06F 9/45558
                                                                711/112

(Continued)

FOREIGN PATENT DOCUMENTS

| CN | 101257375 A | 9/2008 |
|---|---|---|
| JP | 2006-338250 A | 12/2006 |
| WO | 2010114777 A2 | 10/2010 |

OTHER PUBLICATIONS

Japanese Office Action for application 2013-531516 dated Feb. 26, 2014.

(Continued)

Primary Examiner — Vincent F Boccio
(74) Attorney, Agent, or Firm — Hauptman Ham, LLP

(57) ABSTRACT

A cloud computing system includes a plurality of small medium business (SMB) network system and a cloud hosting and storage system. Each of the SMB network systems includes a plurality of first client terminals and a physical network-attached storage (NAS) configured to store one or more original files accessible by at least one of the first client terminals. The cloud hosting and storage system is configured to generate a virtual NAS corresponding to the physical NAS in accordance with one or more requests for cloud hosting service made by the physical NAS through a network, and allocate a virtual storage space for the SMB network system. The virtual storage space is configured to store one or more backup files of the original files stored in the physical NAS.

13 Claims, 11 Drawing Sheets

(58) Field of Classification Search
USPC .......................................................... 707/610
See application file for complete search history.

(56) References Cited

U.S. PATENT DOCUMENTS

| | | | |
|---|---|---|---|
| 2001/0047482 A1* | 11/2001 | Harris | G06F 11/0727 726/26 |
| 2004/0068523 A1* | 4/2004 | Keith, Jr. | G06F 17/30176 |
| 2004/0257983 A1* | 12/2004 | Kopp | H04L 45/00 370/217 |
| 2007/0239722 A1* | 10/2007 | Phillips | G06F 17/30867 707/999.009 |
| 2008/0168108 A1* | 7/2008 | Molaro | G06F 11/1435 |
| 2009/0106455 A1 | 4/2009 | Xu et al. | |
| 2009/0276501 A1* | 11/2009 | Saito | H04L 12/58 709/206 |
| 2010/0005337 A1 | 1/2010 | Bensinger | |
| 2010/0042942 A1 | 2/2010 | Vasilevsky et al. | |
| 2010/0131324 A1 | 5/2010 | Ferris | |
| 2010/0146231 A1 | 6/2010 | Gopalan et al. | |
| 2010/0257143 A1 | 10/2010 | Sosnosky et al. | |
| 2011/0295727 A1* | 12/2011 | Ferris | G06F 11/34 709/224 |
| 2012/0066446 A1* | 3/2012 | Sabjan | G06F 11/1662 711/112 |

OTHER PUBLICATIONS

Chinese Office Action for Chinese application No. 201180051138.9 dated Jan. 28, 2015.
International Search Report dated Jun. 29, 2012 for PCT/KR2011/008165.

* cited by examiner

CLOUD COMPUTING SYSTEM AND DATA SYNCHRONIZATION METHOD

CROSS REFERENCE TO RELATED APPLICATION

This application claims the priority of Korean Patent Application No. 10-2010-0105881, filed on Oct. 28, 2010, and Korean Patent Application No. 10-2010-0135673, filed on Dec. 27, 2010, in the KIPO (Korean Intellectual Property Office). Further, this application is a continuation of International Application No. PCT/KR2011/008165, filed Oct. 28, 2011, claiming priority from the above mentioned Korean Patent Applications, and designating the United States. Each of the above listed applications is hereby incorporated by reference in their entirety into the present application.

TECHNICAL FIELD

The present disclosure relates to a cloud computing system and data synchronization method.

BACKGROUND ART

Generally, a cloud storage service combines physically separated storages into a logical single storage and allocates the storage space on a user basis so that a mass virtual storage can be used by users. Persons, enterprises or organizations join a cloud storage service and are allocated with virtual storage spaces. The amount of the allocated storage space may be different depending on fees for the cloud storage service.

Such cloud storage service is suitable for reduction of storage construction costs, but may have a lot of disadvantages. For example, when small enterprises that do not have a dedicated computer room in terms of cost reduction depend on the cloud storage service, it may not be possible to use data stored in the cloud storage during network interruption.

Meanwhile, a small enterprise having a considerable amount of data constructs a SMB network system that shares data in the enterprise by installing a dedicated NAS in the enterprise and connecting the NAS to computers in the enterprise through a network. In that case, a member of the enterprise in an outside environment (e.g., from outside the enterprise's network) needs to use an extra web folder service to access data stored in the NAS of the SMB. Further, to store data in the NAS, the member of the enterprise in the outside environment should send an e-mail with the file to be stored attached to the email. Moreover, most of the SMB enterprises have only one or two NASs, and a data loss may occur due to disaster and error of the NASs.

SUMMARY

In accordance with some embodiments, there is provided a cloud computing system, which includes: a plurality of SMB (Small Medium Business) network systems, wherein each of the SMB network system includes a plurality of first client terminals and a physical network attached storage (NAS) that stores one or more original files accessible by at least one of the first client terminals; and a cloud hosting and storage system configured to generate a virtual NAS corresponding to the physical NAS in accordance with one or more requests for cloud hosting service made by the physical NAS through a network, and allocate to the virtual NAS a virtual storage space for the SMB network system, wherein the virtual storage space stores one or more backup files of the one or more original files stored in the physical NAS.

In accordance with some embodiments, there is provided a data synchronization method performed by the cloud computing system of claim 1, comprising: requesting a cloud hosting service through the network, the requesting performed by the physical NAS that stores one or more original files accessible by at least one of the first client terminals; generating the virtual NAS corresponding to the physical NAS in accordance with the requesting; allocating the virtual storage space for backing up original files stored in the physical NAS to the virtual NAS; and backing up the original files stored in the physical NAS to the virtual cloud storage space of the virtual NAS.

In accordance with some embodiments, there is provided a cloud computing system comprising: a plurality of SMB (small medium business) network systems, wherein the SMB network system includes a physical network attached storage (NAS) having a shared storage region that is configured to store one or more original files accessible by one or more client terminals; and a cloud storage system configured to receive information on the shared storage region and allocate a virtual storage space in a cloud storage corresponding to the received information on the shared storage region.

DETAILED DESCRIPTION

Hereinafter, example embodiments of the present invention will be described in detail with reference to the accompanying drawings. Throughout the drawings, like or similar elements are referred to like numerals.

Figure 1:
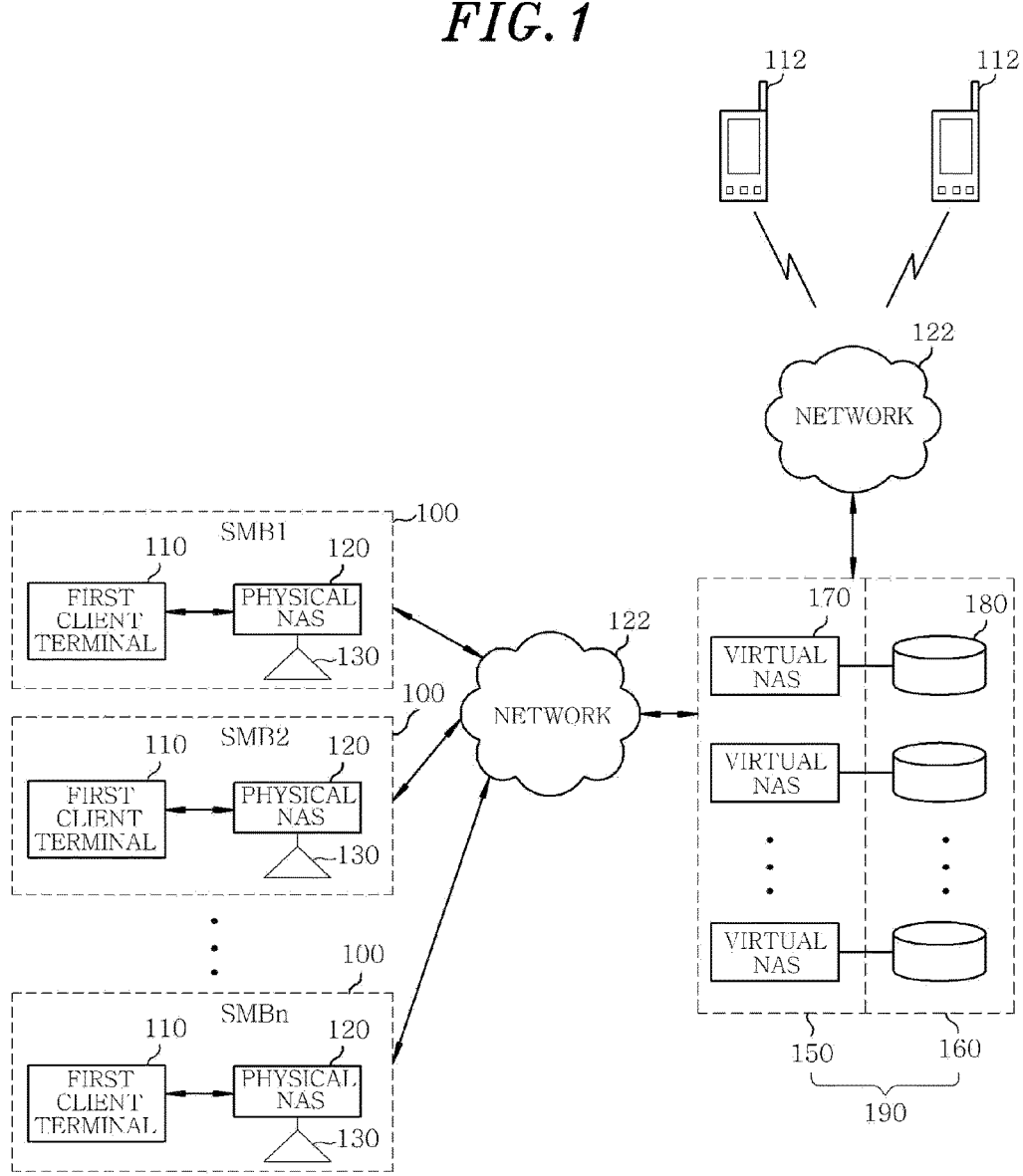
FIG. 1 is a schematic block diagram of a cloud computing system in accordance with at least one embodiment of the present invention.

FIG. 1 is a block diagram of a cloud computing system in accordance with at least one embodiment of the present invention.

The cloud computing system in accordance with some embodiments of the present invention includes a network 122, a plurality of SMB network systems 100 and a cloud hosting and storage system 190 for providing cloud service to the respective SMB network systems 100 that are connected to, e.g., a wired/wireless Internet. Each of the SMB network systems 100 includes one or more first client terminals 110, and a physical NAS 120 connected to the first client terminals 110 through an intranet. Here, the physical NAS 120 serves as a data storage device for storing data or file processed by the first client terminal 110, and further includes a NAS storage 130 which stores data or files processed by the first client terminals 110. The NAS storage 130 includes one or more physical, actual storage devices. Examples of physical, actual storage devices include, but are not limited to, magnetic media such as, a hard disk, a floppy disk, and a magnetic tape, optical media such as a CD-ROM and a DVD, magneto-optical media such as a floptical disk, and a hardware device configured especially to store and execute a program, such as a ROM, a RAM, a solid state drive, and a flash memory. The physical NAS 120 is, for example, a controller of the NAS storage 130 and is implemented by one or more programmed processors and/or application-specific integrated circuits (ASICs).

Each of the first client terminals 110 is a terminal such as a personal terminal allocated to each member of the enterprise. The first client terminal 110 generates data or file and stores the generated data or file in the NAS storage 130 in the SMB network system 100. Further, the first client terminal 110 accesses the file stored in the NAS storage 130 and corrects, edits or deletes the file. Herein, the generation, correction, redaction or deletion of the file is referred to as file change. The first client 110 is not limited to a personal computer but may be, e.g., a notebook computer, a PDA (personal digital assistant) having a communication function or the like. Moreover, the first client terminal 110 may include a cellular phone, a smart phone or the like.

The cloud hosting and storage system 190 includes a cloud hosting server 150 and a cloud storage 160. The cloud hosting server 150 provides a cloud hosting service that generates virtual NASs 170 corresponding to the physical NASs 120 based on cloud hosting requests from the SMB network systems 100. The virtual NASs 170 are connected to the corresponding physical NASs 120 of the SMB network system 100 through the network 122, e.g., a wired/wireless Internet. The respective virtual NASs 170 are allocated with the storage spaces 180, and the virtual storage spaces 180 serves as virtual cloud storage spaces corresponding to the NAS storages 130 of the SMB network system 100. The virtual storage spaces 180 are used for backing up data stored in the NAS storages 130 of the physical NASs 120.

The second client terminal 112 is used as a sub-terminal owned by a member of an enterprise. The second client terminal 112 is not limited to a personal computer but may include, e.g., a cellular phone, a smart phone or a PDA. The second client terminal 112 can store data or file in the virtual NAS 170 by accessing the cloud hosting server 150 through the network 122 and change the stored file. Thus, a user of the second client terminal 112 can use files used in the enterprise in an environment outside the enterprise via the virtual NAS. Accordingly, a mobile office environment can be constructed.

Figure 2:
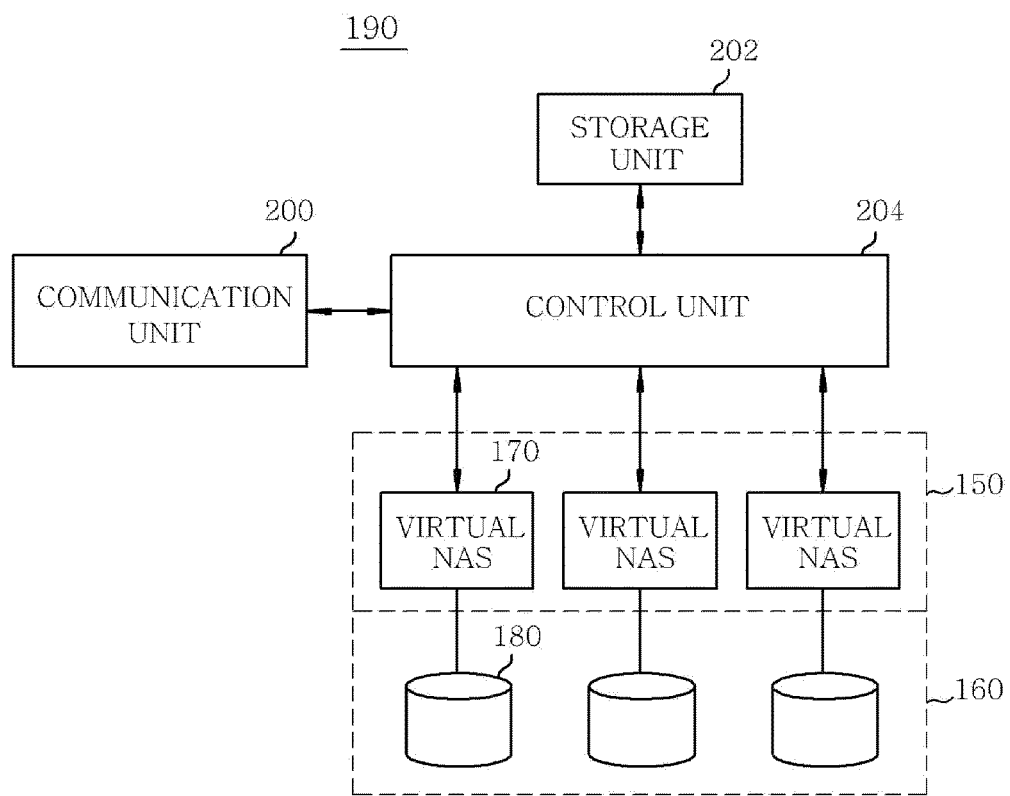
FIG. 2 is a detailed block diagram of a cloud hosting and storage system shown in FIG. 1.

FIG. 2 is a detailed block diagram of a cloud hosting and storage system shown in FIG. 1.

As shown in FIG. 2, the cloud hosting and storage system 190 further includes a communication unit 200, a control unit 204, and a storage unit 202.

The communication unit 200 transmits and receives data with respect to the physical NASs of the SMB network systems 100 through the network 122 under the control of the control unit 204, and transmits and receives data with respect to the second client terminal 112 through the network 122. The communication unit 200 may be implemented as, e.g., a network interface.

The control unit 204 controls overall operations of the cloud hosting server 150 in accordance with a control program stored in the storage unit 202. The control unit 204 generates virtual NASs interlocking with the physical NASs 120 of the SMB network systems 100 in accordance with the cloud housing requests of the SMB network systems 100, and backs up data in the virtual storage spaces 180 allocated to the virtual NASs 170.

Further, when the access to the backup file stored in the virtual storage space 180 is requested from the second client terminal 112 through the network 122, the control unit 204 authenticates the second client terminal 112 and provides the backup file identical to the file stored in the physical NAS 120 from the virtual storage space 180 to the authenticated second client terminal 112. Accordingly, a mobile office environment of the second client terminal 112 is provided.

Although the storage spaces 180 are referred to herein as "virtual storage spaces," the virtual storage spaces 180 include physical, actual storage devices, for example, as described with respect to the NAS storage 130. In some embodiments, each of the virtual storage spaces 180 includes one or more physical, actual storage devices which are distributed across a network, e.g., the Internet, and which are managed by a common controller, i.e., the corresponding virtual NAS 170. The virtual NAS 170 is implemented by one or more programmed processors and/or ASICs and is controlled and/or managed by the control unit 204 which, it turns, is also implemented by one or more programmed processors and/or ASICs. The virtual NASs 170 reside in the same computer system(s) as the control unit 204, and/or reside at remote locations from the control unit 204. The storage unit 202 includes, for example, one or more memories and/or storage devices. The cloud hosting server 150 is configured, e.g., programmed, to implement and/or manage the virtual NASs 170 which manage the virtual storage spaces 180 which, in turn, are commonly referred to as the cloud storage 160.

Figure 3:
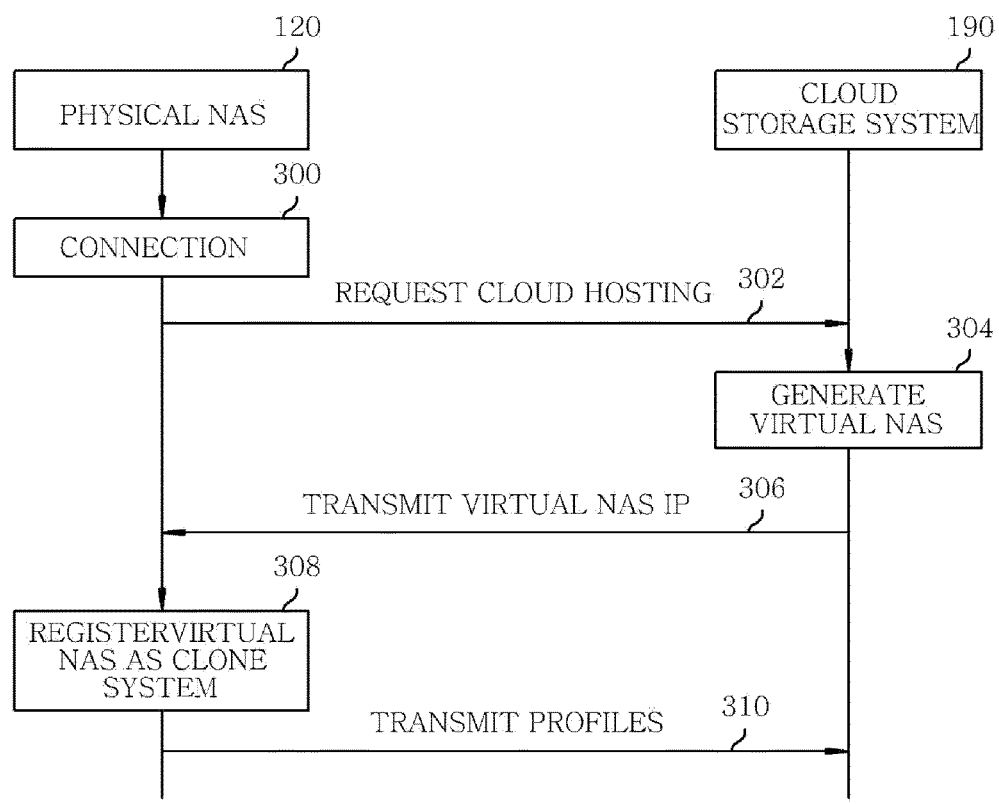
FIG. 3 is a flowchart of a process for generating a virtual NAS in accordance with at least one embodiment of the present invention.

FIG. 3 is a flowchart of a process for generating a virtual NAS in a cloud computing system in accordance with at least one embodiment of the present invention.

When the data stored in the physical NAS 120 of the SMB network systems 100 needs to back up, the SMB network systems 100 connects to the cloud hosting server 150 through the network 122 (step 300) and requests the cloud hosting server 150 to do the cloud hosting service to generate the virtual NAS 170 corresponding to the physical NAS 120 and the virtual storage space 180 (step 302).

In response thereto, the cloud hosting server 150 generates the virtual NAS 170 to be interlocked with the physical NAS 120 of the SMB 100 and allocates the virtual storage spaces 180 managed by the virtual NAS 170 (step 304). During the allocation, the cloud hosting server 150 installs a specialized OS Operating System) for the virtual NAS 170 as an OS for a virtual machine.

Next, the cloud hosting server 150 transmits IP addresses of the generated virtual NAS 170 to the SMB network system 110 (step 306).

Then, the SMB network system 110 receives the IP addresses of the virtual NAS 170 and registers the virtual NAS 170 as clone systems of the physical NAS 120 (step 308).

Next, in step 310, the profile such as authority information and user accounts for identifying the first client terminals 110 of the SMB network system 100 which are registered in the physical NAS 120 is transmitted to the virtual NAS 170 so that the SMB network system 100 and the cloud hosting server 150 can share the same profile. The physical NAS 120 of the SMB network system 100 shares the data with the virtual NAS 170 of the cloud hosting server 150 and therefore any member of the SMB network system 100 can be connected to the virtual NAS 170 as well as the physical NAS 120 and, the same data can also be shared.

The data synchronization between the physical NAS 120 and the virtual NAS 170 may be classified into batch synchronization and partial synchronization. The batch synchronization refers to the process of comparing files stored in the physical NAS 120 and those stored in the virtual NAS 170 and performing a batch synchronization on changed files. On the other hand, the partial synchronization refers to the process of completing file change such as generation, correction or deletion of files in the first client terminals 110 of the SMB network system 100 and then performing a data synchronization only on the changed files between the physical NAS 120 and the virtual NAS 170.

Figure 4:
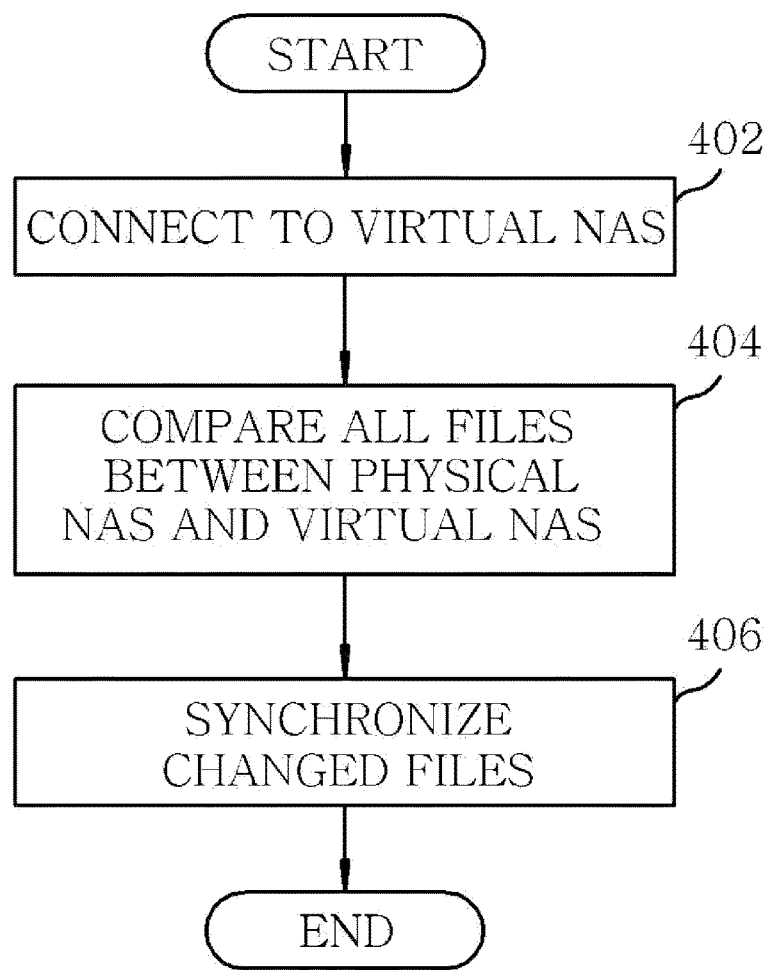
FIG. 4 is a flowchart of steps for data synchronization between a physical NAS and a virtual NAS in accordance with at least one embodiment of the present invention.

FIG. 4 is a flowchart of a process for batch synchronization of data between the physical NAS 120 and the virtual NAS 170 in the cloud computing system in accordance with some embodiments of the present invention.

In order to perform the batch synchronization, the SMB network system 100 is connected to its corresponding virtual NAS 170 in the cloud hosting server 150 through the network 122 (step 402).

Next, the files stored in the physical NAS 120 and those stored in the virtual NAS 170 are sequentially compared in accordance with a hierarchical file structure (step 404).

If changed files having different data are found as a result of the sequential file comparison between the physical NAS 120 and the virtual NAS 170, the changed files are transmitted from the physical NAS 120 to the virtual NAS 170 and replaced by backup files in the virtual storage spaces 180 of the virtual NAS 170. Accordingly, the batch synchronization between the physical NAS and the virtual NAS is carried out (step 406).

Figure 5:
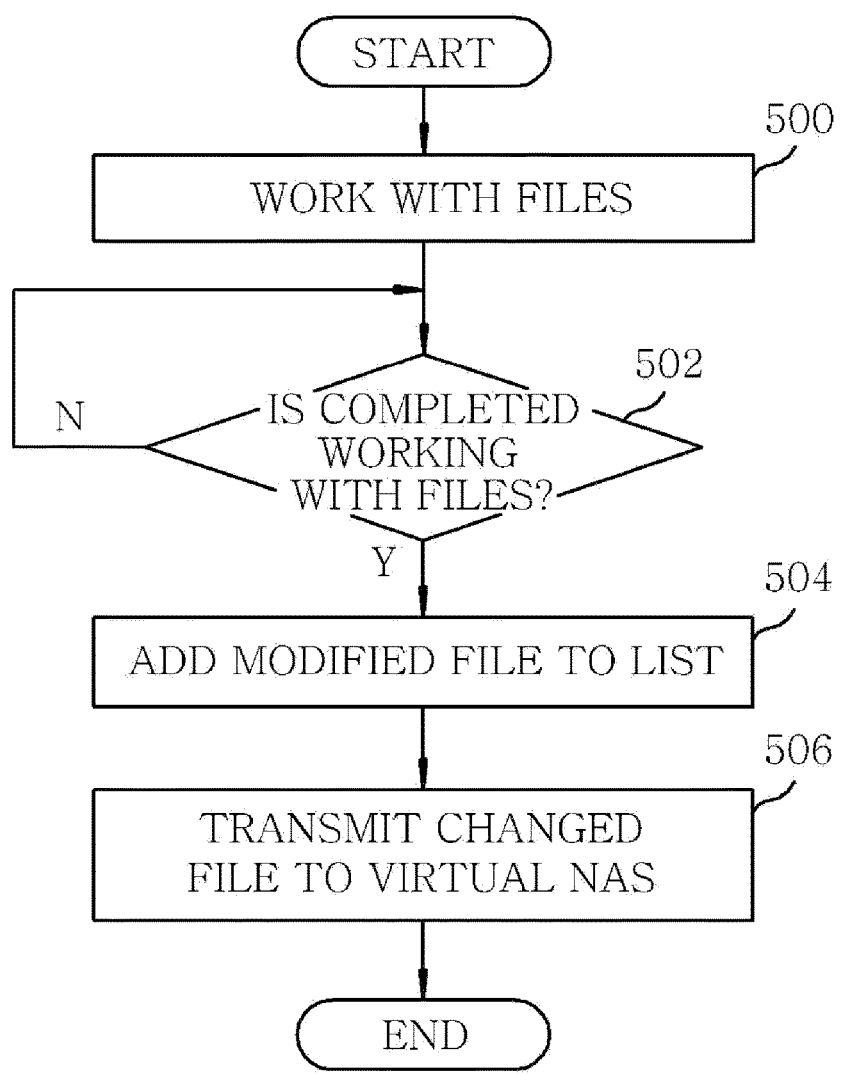
FIG. 5 is a flowchart of a process for data synchronization in the physical NAS in accordance with at least one embodiment of the present invention.

FIG. 5 is a flowchart of a process of a partial synchronization of data between the physical NAS 120 and the virtual NAS 170 in the cloud computing system in accordance with some embodiments of the present invention.

The first client terminals 110 of the SMB network system 100 performs a file change such as generation, correction or deletion of a file (step 500), and the physical NAS 120 check whether or not the file change performed by the first client terminals 110 has been completed (step 502).

If it is checked that the file change has been completed, the physical NAS 120 additionally registers changed files that have been subjected to generation, correction or deletion of the list of the changed files (step 504).

Then, the list of changed files is transmitted to the virtual NAS 170 for each preset time (step 506). Therefore, the partial data synchronization between the physical NAS 120 and the virtual NAS 170 is performed in accordance with the list of the changed files.

Figure 6:
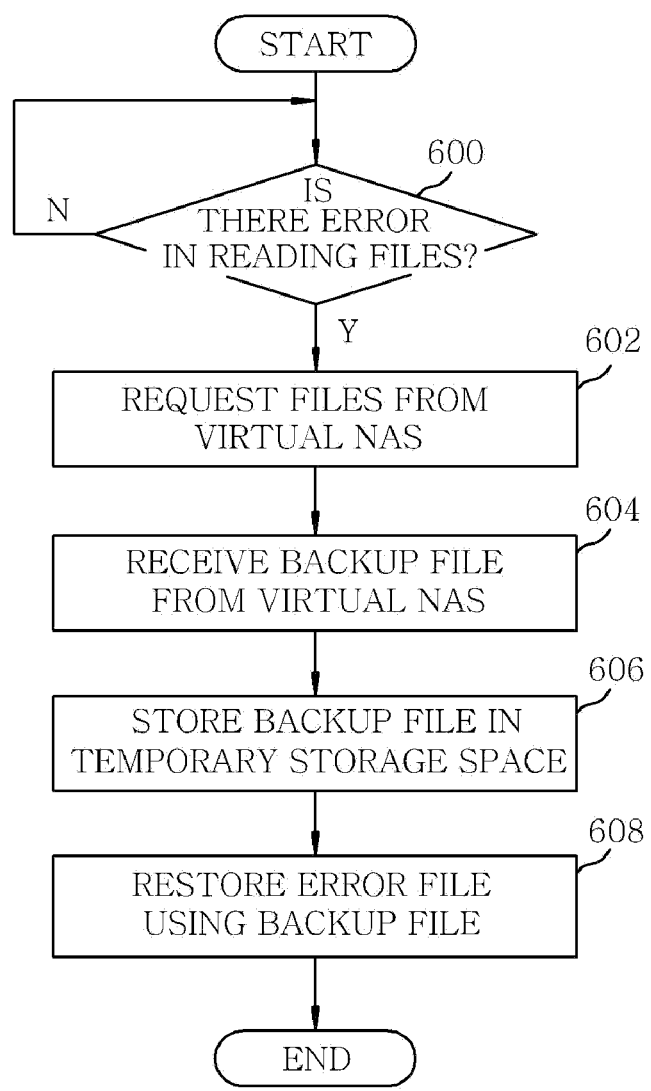
FIG. 6 is a flowchart of a process for data recovery in the physical NAS in accordance with at least one embodiment of the present invention.

FIG. 6 is a flowchart of a process for data recovery in the physical NAS in the cloud computing system in accordance with at least one embodiment of the present invention.

First, the first client terminals 110 checks whether or not an error occurs while it reads a file from the physical NAS 120 (step 600). If the first client terminals 110 determines that an error occurs while it reads the file, the first client terminals 110 informs the occurrence of the error of the manager of the SMB network system 100, and makes a request for the copy of the error file or the backup file to its corresponding virtual NAS 170 in the cloud hosting server 150 in order to recover the error file (step 602).

In response thereto, the virtual NAS 170 searches the requested backup file from the virtual storage space 180 and then transmits the searched backup file to the physical NAS 120.

The physical NAS 120 then receives the backup file from the virtual NAS 170 (step 604) and store the received backup file in a temporary storage space of the physical NAS 120 (step 606).

Next, the error file on the physical NAS 120 is recovered by replacing the file having a reading error with the backup file (step 608).

Figure 7:
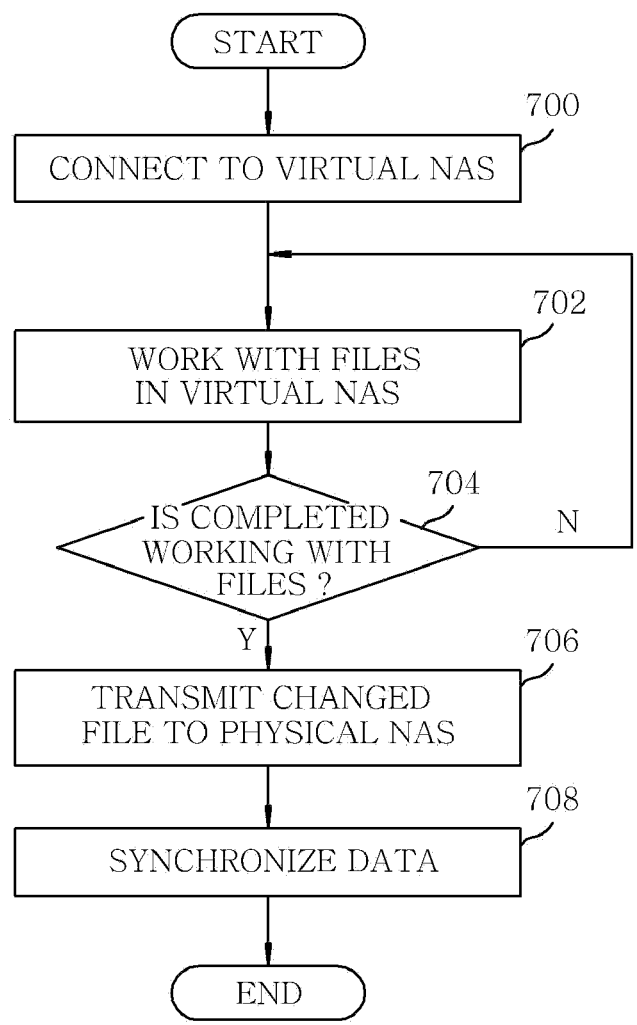
FIG. 7 is a flowchart of a process for data synchronization in the virtual NAS in accordance with at least one embodiment of the present invention.

FIG. 7 is a flowchart of a process for data synchronization in the virtual NAS in the cloud computing system in accordance with at least one embodiment of the present invention.

When a member of an enterprise wants to access the virtual NAS 170 of the cloud hosting server 150 in an outside environment (e.g., when the member is not connected to the intranet of the enterprise) and works with files, the member may be connected to the virtual NAS 170 of the cloud hosting server 150 through the network 122 by using his/her second client terminal 112 (step 700).

Then, the file change such as generation, correction or deletion of file may be performed in the virtual NAS 170 (step 702).

The virtual NAS 170 checks whether or not the file change has been completed (step 704). If it is checked that the file change has been completed, the virtual NAS 170 transmits the changed file to the physical NAS 120 (step 706).

Hence, the physical NAS 120 receives the changed file from the virtual NAS 170 and exchanges with the received changed file its original file, thereby performing data synchronization between the physical NAS 120 and the virtual NAS 170 (step 708).

In accordance with at least one embodiment, the timing in which data synchronization is performed by transmitting the changed files from the virtual NAS 170 to the physical NAS 120 may be determined at a preset time interval, e.g., in the unit of "day", "hour" or the like. Further, the data synchronization between the physical NAS 120 and the virtual NAS 170 may be performed when the data is transmitted from the virtual NAS 170 to the physical NAS 120, or may be performed after the check of the manager of the SMB network system is completed or after an additional operation such as virus scanning or the like is performed.

Figure 8:
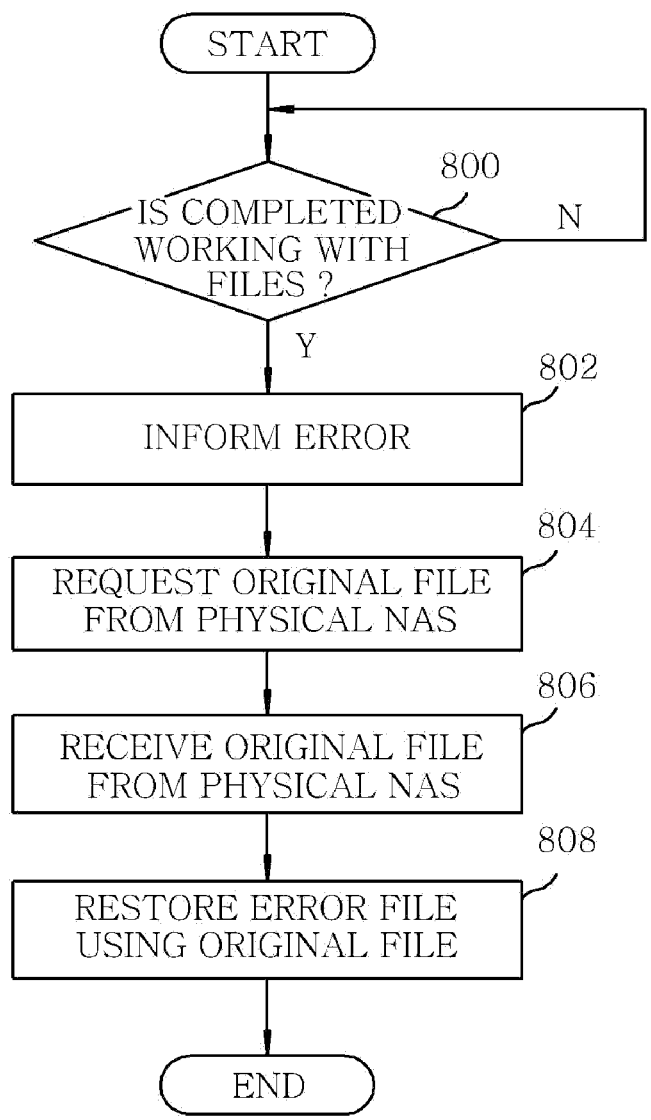
FIG. 8 is a flowchart of a process for data recovery in the virtual NAS in accordance with at least one embodiment of the present invention.

FIG. 8 is a flowchart of an operation for data recovery in the virtual NAS in the cloud computing system in accordance with at least one embodiment of the present invention.

The second communication terminal 112 may access the virtual NAS 170 and request a desired file. The virtual NAS 170 checks whether or not an error occurs while a file stored in the virtual storage space 180 is being read (step 800).

If it is checked that an error occurs while the file stored in the virtual storage space 180 is being read, the virtual NAS 170 informs the user of the second client terminal 112 of the fact that the files cannot be read because of the error (step 802).

Next, in step 804, the virtual NAS 170 requests an original of the error file from the physical NAS 120. In response to the request of the original from the virtual NAS 170, the physical NAS 120 searches the original of the error file which has been requested by the virtual NAS 170 and transmits the searched original to the virtual NAS 170.

Thereafter, the virtual NAS 170 receives the original of the error file from the physical NAS 120 (step 806), and then recovers the error file stored in the virtual storage space 180 by replacing the error file having a reading error with the received original (step 808).

As described above, data back up between the physical NAS and the virtual NAS can be carried out by generating the virtual NAS corresponding to the physical NAS in the SMB network system by using the cloud hosting service and then performing data synchronization between the physical NAS and the virtual NAS. Further, by virtue of the data synchronization between the physical NAS in the SMB network system and the virtual NAS of the cloud hosting server, a mobile office environment in which a member of an enterprise in an outside environment can reach the backup data managed by the cloud hosting server by using the second client terminal as a sub-terminal can be constructed.

Figure 9:
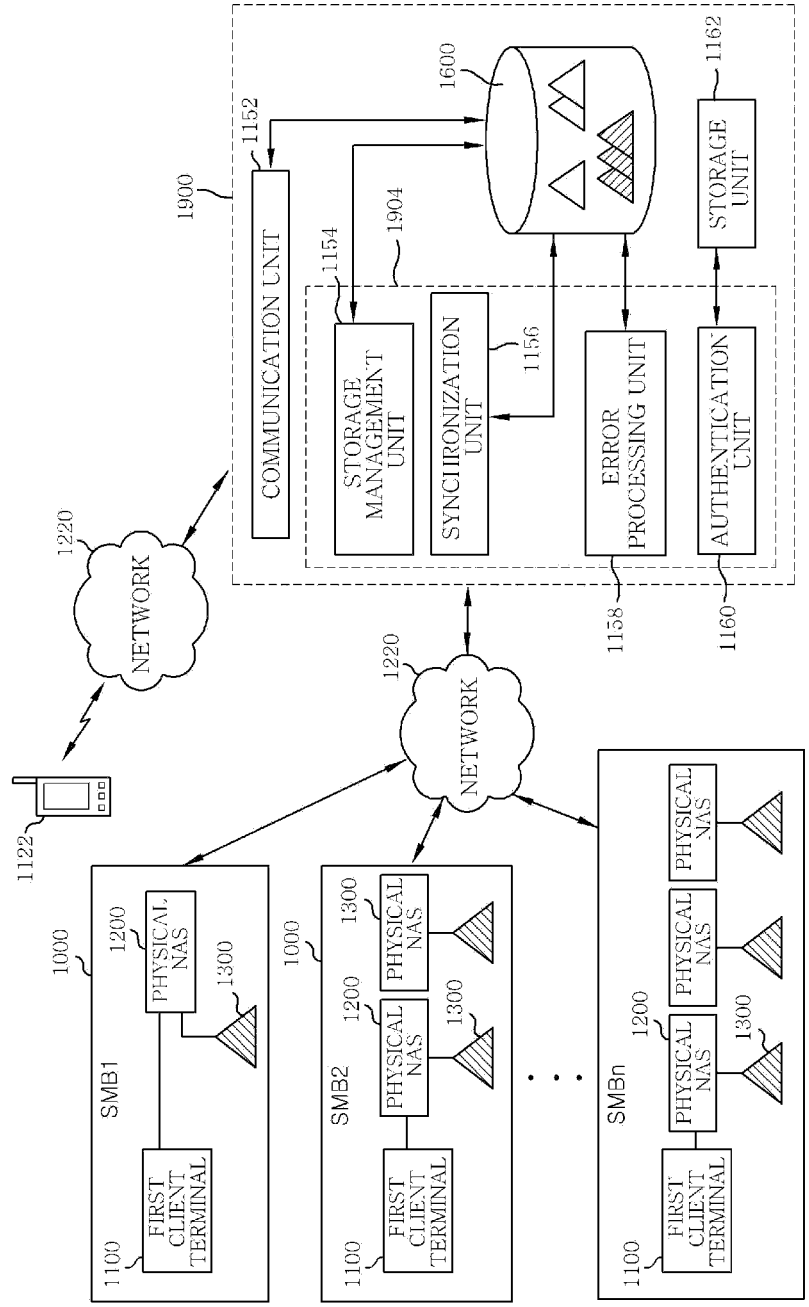
FIG. 9 is a block diagram of a cloud computing system in accordance with at least an embodiment of the present invention.

FIG. 9 shows a block diagram of a cloud computing system in accordance with at least one embodiment of the present invention.

The embodiment shown in FIG. 9 is similar in various aspects to one or more embodiments disclosed in the foregoing description except that the cloud hosting service is not used.

As illustrated, the cloud computing system includes a plurality of network systems 1000 and a cloud storage system 1900 that are connected through a wired/wireless network 1220.

Each of the SMB network systems 1000 includes: one or more first client terminals 1100; one or more NASs 1200, connected to the first client terminals 1100 through an intranet, for providing each folder of the first client terminals 1100 and a dedicated folder of an individual first client terminal 110; and a NAS storage 1300.

Each of the first client terminals 1100 is a terminal such as a personal computer provided to each member of an enterprise. The first client terminal 1100 generates data or file and stores the data or file in the NAS storage 1300. Further, the first client terminal 1100 accesses the files stored in the NAS storage 1300 and may perform a file change Herein, the file change refers to the generation, correction, redaction and deletion of the file. The first client 1100 is not limited to a personal computer but may include, e.g., a laptop computer, a PDA (personal digital assistant) having a communication function, or the like. Moreover, the first client terminal 1100 may include a cell phone, a smart phone or the like.

The second client terminal 1122 refers to a sub-terminal owned by each member of an enterprise and may include a cellular phone, a smart phone, or a PDA. The second client terminal 1122 is connected to the cloud storage system 1900 through the network 1220 and performs file change such as generation, correction, deletion of data or file in a virtual storage space 1600. Thus, a user of the second client terminal 1122 can reach the file identical to the file used in the enterprise by connecting to the virtual storage space 1600 via the cloud storage system 1900. Accordingly, a mobile office environment can be constructed.

The NAS 1200 may include one or more NAS storages 1300. For example, a first system 1000 shown in FIG. 9 includes a file system hierarchical structure having a single NAS 1200 and a single NAS storage 1300. A second and a third SMB 1000 includes a file system hierarchical structure having two NASs 1200 and three NAS storages 1300.

In at least one embodiment of the present invention, the case in which each of the SMB network systems includes a one-to-one mapping hierarchical structure between the NASs 1200 and the NAS storages 1300 has been described as an example. However, it is apparent to those skilled in the art that a multi-to-multi (M:N (M>N)) mapping structure may be employed instead of the one-to-one mapping structure.

Each of the SMB network systems 1000 sets a shared storage region that is shared in the NAS storages 1300 of the NASs 1200. In other words, the SMB network system 1000 sets a specific folder selected from a folder hierarchical structure of the file system supported by the file system of the NAS 1200 as the shared storage region. Information on the shared storage region is provided to the cloud storage system 1900. In the folder hierarchical structure of the file system, the selection of a specific folder means that the specific folder and its subfolders are also selected. Thus, the information on the shared storage region includes information on the selected specific folder and information on the subfolders of the selected specific folder.

Meanwhile, the NAS 1200 stores therein information for identifying and authenticating members in the SMB network system, e.g., profile information including ID, password or fingerprint information. Such profile information is provided to the cloud storage system 1900 so that the same profile can be shared by the SMB network system 1000 and the cloud storage system 1900.

The cloud storage system 1900 includes the cloud storage 1600, and performs synchronization between data stored in the shared storage region of the storages 1300 of the NASs 1200 and data stored in the cloud storage 1600. Moreover, the cloud storage system 1900 further includes a communication unit 1152, a storage unit 1162 and a control unit 1904. The control unit 1904 functionally includes a storage management unit 1154, a synchronization unit 1156, an authentication unit 1160, and an error processing unit 1158.

The communication unit 1152 provides data in accordance with a request from the second client terminal 1120 connected through the network 1120.

The storage management unit 1154 receives the information on the shared storage region from the NASs 1200 and allocates a virtual backup storage space (triangles indicated by dashed lines in the cloud storage 1600) in the cloud storage 1600 based on the information on the shared storage region. The virtual storage spaces of the cloud storage 1600 are virtual cloud storage spaces corresponding to the NAS storages 1300 of the SMB network systems, and used for backing up the data stored in the NAS storage.

The synchronization unit 1156 performs data synchronization when there occurs the change in the files in the virtual backup storage spaces set in the cloud storage 1600 by the NASs 1200. In other words, when the files stored in the virtual storage spaces set in the cloud storage 1600 are changed, the synchronization unit 1156 transmits the changed files to the NASs 1200 so that the files stored in the shared folder of the storages 1300 of the NASs 1200 can be updated. Meanwhile, if the original file stored in the shared folder of the storages 1300 of the NASs 1200 is changed, the synchronization unit receives the changed original file from the NASs 1200 to update the backup files stored in the virtual backup storage spaces of the cloud storage 1600. Herein, the file change denotes the generation, storage, correction, redaction or deletion of the file.

Meanwhile, the data synchronization may be performed by the synchronization unit 1156 based on various references including storage priority, cloud storage priority, set time priority and request priority.

The storage priority denotes that data synchronization is performed when the file in the shared folder of the storage 1300 is changed. The cloud storage priority denotes that data synchronization is performed when the file in the cloud storage 1600 is changed. The set time priority denotes that data synchronization is performed in accordance with the time set by the manager of the SMB network system 1000 or the manager of the cloud storage system 1900. The request priority denotes that data synchronization is performed when the request of the manager of the SMB network system 1000 is received.

The authentication unit 1160 receives the profile of the manager who manages the NAS 1200 and the profiles of the members who can reach the cloud storage 1600 from the SMB network system 1000, stores the received profiles in the storage unit 1162, and manages the stored profiles. When the access to the cloud storage 1600 is requested by any member, the authentication management unit 1160 generates an announcement message and transmits the generated announcement message to the manager of the SMB network system 1000 by referring to the profile of the manager stored in the storage unit 1162.

If an error occurs while data in the cloud storage 1600 is being read, the error processing unit 1158 receives the original file corresponding to the error file from the NAS 1200 and recovers the error file in the cloud storage 1600 by using the received original file. Further, when the SMB network system 1000 requests the backup of the error file, the error processing unit 1158 searches the backup file corresponding to the error file from the cloud storage 1600 and then provides the searched backup file to the SMB network system 1000. Here, the file error is an error that occurs when a file requested to be read by the terminal 1122 has been erroneously stored in the cloud storage 1600 or an error that occurs while the file is being read.

The control unit 1904, the communication unit 1152, and the storage unit 1162 are configured similarly to the control unit 204, the communication unit 200, and the storage unit 202. The cloud storage 1600 is configured similarly to the cloud storage 160, i.e., the cloud storage 160 includes one or more actual, physical storage devices distributed over a network. However, unlike the cloud storage 160 where virtual storage spaces 180 are established and managed individually by corresponding virtual NASs 170, the cloud storage 1600 is centrally managed by the control unit 1904.

Figure 10:
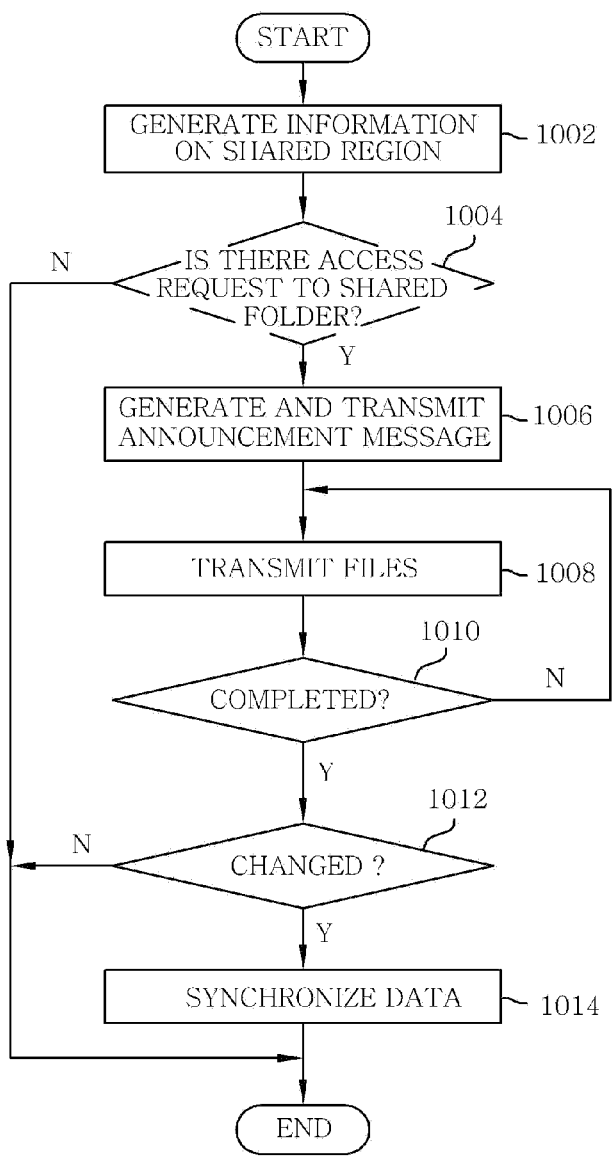
FIG. 10 is a flowchart of a process for data synchronization in the cloud computing system in accordance with at least an embodiment of the present invention.

FIG. 10 is a flowchart of a process of data synchronization in a cloud computing system in accordance with at least an embodiment of the present invention.

As shown in FIG. 10, in order to set a shared folder, a specific folder is selected from the folder hierarchical structure supported by the file systems of one of the NASs 1200. The NAS 1200 sets the storage spaces of the storages 1300 containing the selected folder and the subfolders thereof as the shared storage region (step 1002). The information on the set shared storage region is provided to the cloud storage system 1900, and the storage management unit 1154 of the cloud storage system 1900 allocates the virtual storage spaces in the cloud storage 1600 as the storage spaces of the SMB network systems 1000 based on the received information on the shared storage region.

In a state where the shared storage space is secured in the NAS storage 1300, it is checked whether or not the access to the data in the storages 1300 is requested from the client terminals 1100 and/or 1122 of any members in the SMB network system 1000 (step 1004). If the access request is checked, the SMB network system 1000 generates an announcement message that there is the access request and transmits the generated announcement message to the manager of the SMB network system 1000 (step 1006). For example, the NAS 1200 displays the announcement message on the screen of the first client terminal of the manager, or send the announcement message by email, or transmit the announcement message to the second terminal of the manager.

Next, the NAS 1200 of the SMB network system 1000 provides the service for searching files requested by the client terminals 1100 and/or 1122 from the shared folder and transmitting the searched files (step 1008).

Thereafter, when the service requested from the client terminals 1100 and/or 1122 is completed (step 1010), it is checked whether or not the file in the shared folder is changed (step 1012). Herein, the file change denotes the generation, deletion, correction, redaction or addition of the file.

If it is checked that the file in the shared folder is changed, the process proceeds to step 1014. In step 1014, the changed file is provided to the cloud storage system 1900 and backed up in the virtual storage space, thereby resulting in data synchronization between the NAS storages 1300 of the SMB network system 1000 and the cloud storage 1600. In other words, the synchronization unit 1156 of the cloud storage system 1900 receives the changed file from the NAS 1200 and updates the backup files in the virtual storages of the cloud storage 1600. As a consequence, the synchronization between the storages 1300 of the NAS 1200 and the cloud storage 1600 is achieved.

Meanwhile, if an error occurs while a file in the shared folder is being read by the NAS 1200 in step 1008, the NAS 1200 requests the backup file or copy of the error file to the cloud storage system 1900. In response to this request, the cloud storage system 1900 provides the backup file corresponding to the error file to the NAS 1200. The NAS 1200 stores the backup file in a temporary storage space, reads the file stored in the temporary storage space, and provides the read file to the client terminals 1100 and/or 1122. Further, the NAS 1200 may recover the data stored in the shared folder in the NAS storages 1300 by using the data stored in the temporary storage space.

In at least one embodiment of the present invention, the case in which the data synchronization is performed when the service is completed after the file in the shared folder is changed has been described as an example. However, the data synchronization may be performed in accordance with the rule set by the manager of the NAS 1200 or the rule set by the manager of the cloud storage system 1900. For example, in the case of using a rule of a predetermined time interval set by the manager of the NAS 1200, the changed file in the shared folder of the NAS storages 1300 is provided to the cloud storage system 1900 at a predetermined time interval, or the changed file may be received from the cloud storage system 1900 at a predetermined time interval.

Further, the data synchronization may be performed based on the request of the manager of the NAS 1200 or the request of the manager of the cloud storage system 1900.

In accordance with at least one embodiment of the present invention, the virtual spaces corresponding to the shared folder are allocated in the cloud storage 1600 by setting the shared folder in the storages 1300 of the NAS 1200, and the synchronization of the data between the allocated virtual storage spaces and the shared folder is performed. Accordingly, the data loss caused by the occurrence of errors in the NAS storages 1300 can be avoided, and a user can use the data in the cloud storage by connecting to the cloud storage 1600 even in the outside of the SMB network system 1000 as in the case of using the data in the shared folder of the SMB network system.

Figure 11:
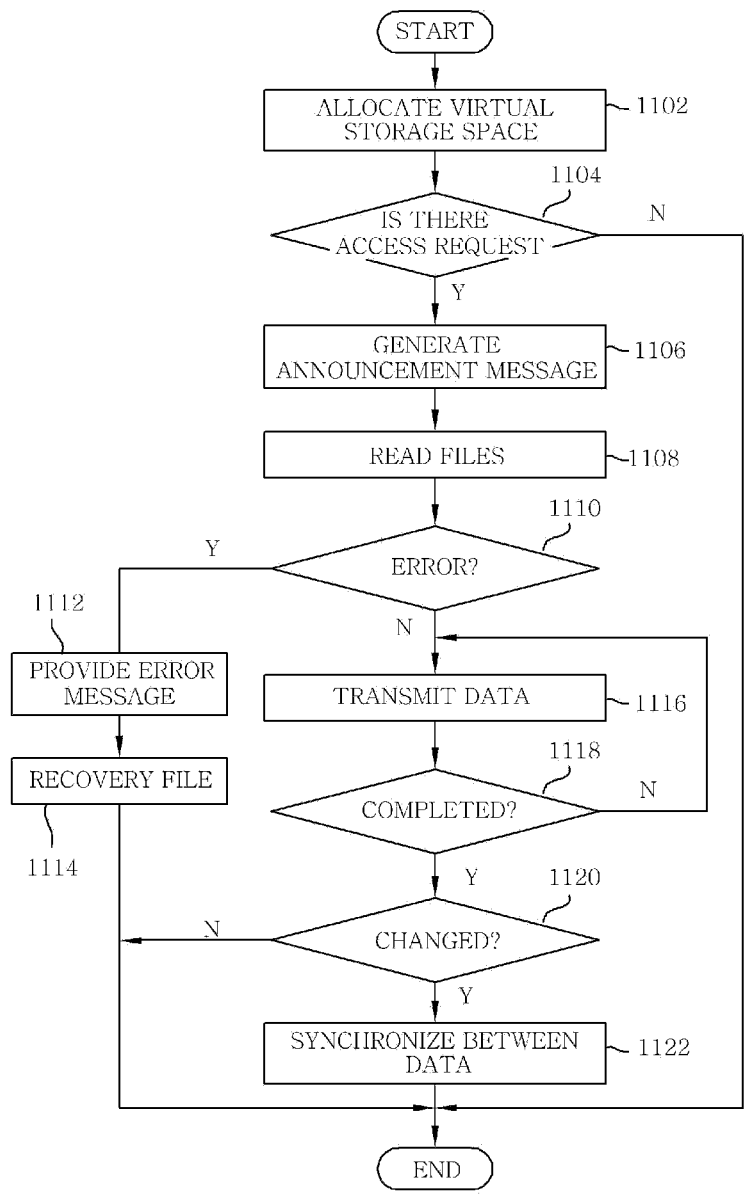
FIG. 11 is a flowchart of a process for data synchronization in a cloud computing system in accordance with still at least an embodiment of the present invention.

FIG. 11 is a flowchart of a process for data synchronization in a cloud computing system in accordance with at least one embodiment of the present invention.

As illustrated in FIG. 11, in order to set a shared folder, a specific folder is selected from the folder hierarchical structure supported by the file systems. The NAS 1200 sets the shared storage region in the NAS storages 1300 based on the selected folder and the subfolders thereof. The information on the set shared storage region is provided to the cloud storage system 1900, and the storage management unit 1154 of the cloud storage system 1900 allocates virtual storage spaces for data synchronization in the cloud storage 1600 to the SMB network systems 1000 based on the information on the shared storage region (step 1102). In a state where the virtual storage spaces are allocated in the cloud storage 1600, it is checked whether or not the access to the data in the cloud storage 1600 is requested from the second client terminal 1122 through the network 1220 is checked (step 1104).

If the access request is checked, a message that informs the request for access to the file in the cloud storage 1600 of the second client terminal 1122 is generated, and the generated announcement message is transmitted to the SMB network system 1000 (step 1106). Next, the file requested by the second client terminal 1122 is searched from the cloud storage 1600 (step 1108).

Then, it is checked whether or not an error occurs while the file is being searched or being transmitted (step 1110). If an error is not checked, the process proceeds to step 1116 where the service for transmitting the searched file to the second client terminal 1122 is provided. However, if an error is checked, a message that informs that the file cannot be provided because of the error is generated by the error processing unit 1158 and then provided to the second client terminal 1122 (step 1112).

Thereafter, the error processing unit 1158 requests the backup file of the error file to the NAS 1200 of the SMB network system 1000, receives the backup file, and recovers the error file of the cloud storage 1600 (step 1114).

Meanwhile, in step 1118, it is checked whether or not the service requested by the second client terminal 1122 is completed. After the service is completed, the synchronization unit 1156 checks whether or not the file change occurs in the virtual storage spaces of the cloud storage 1600 (step 1120). If the file change is checked, the synchronization unit 1156 transmits the changed file to the NAS 1200 so that the file stored in the shared folder in the storages 1300 of the NAS 1200 can be updated. Hence, the data synchronization between the storages 1300 of the NAS 1200 and the cloud storage 1600 is carried out.

The above methods are performed by one or more processors of one or more computer systems as described herein, e.g., by the control unit 204, control unit 1904 and/or one or more of the NASs 120, 1200 and 170. The one or more processors are hardwired and/or programmed to perform the described example operations. Further, the described example operations are not necessarily required to be performed in the order shown and/or described. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

As described above, the virtual storage spaces corresponding to the shared folder of the SMB network system are set in the cloud storage, and the data synchronization between the set virtual storage spaces and the shared folder is performed. Accordingly, even if an error occurs in the data in the virtual storage spaces or the shared folder, the data can be recovered and the file system can be constructed at a low cost.

While some embodiments of the invention have been described, it will be understood by those skilled in the art that various changes and modification may be made without departing from the scope of the invention as defined in the following claims.

The invention claimed is:

1. A cloud computing system, comprising:
a plurality of Small Medium Business (SMB) network systems, wherein each of the SMB network systems includes
a plurality of client terminals and
a physical network attached storage (NAS) that stores
a plurality of original files accessible by at least one of the plurality of client terminals through an intranet; and
a cloud hosting and storage system configured to
generate a virtual NAS corresponding to the physical NAS in accordance with a request for cloud hosting service made by the physical NAS through an internet,
allocate to the virtual NAS a virtual storage space for the SMB network system and
perform data synchronization between the physical NAS and the virtual NAS through the internet,
wherein the virtual storage space stores a plurality of backup files of the plurality of original files stored in the physical NAS,
wherein the physical NAS is configured to
store first identification information for identifying and authenticating members registered in the SMB network systems, and
transmit the first identification information to the cloud hosting and storage system,
wherein the cloud hosting and storage system is configured to
receive the first identification information from the SMB network systems,
generate second identification information which is identical to the first identification information, based on the received first identification information, and
store the generated second identification information, and
wherein the cloud hosting and storage system is configured to authenticate one of the members trying to access, by using a mobile terminal through the internet, the virtual NAS outside the SMB network systems with the second identification information, wherein the physical NAS is configured to transmit, when one of the plurality of original files stored in the physical NAS is changed, the changed original file to the virtual NAS, and wherein the virtual NAS is configured to synchronize, when one of the plurality of backup files in the virtual storage space of the virtual NAS is changed by the accessed mobile terminal of the authenticated member, the plurality of original files stored in the physical NAS with the changed backup file by transmitting the changed backup file to the physical NAS.

2. The cloud computing system of claim 1, wherein the physical NAS is configured to register the generated virtual NAS as a clone system of the physical NAS and provide all original files managed by the physical NAS to the virtual NAS to perform a data synchronization between the physical NAS and the virtual NAS.

3. The cloud computing system of claim 2, wherein the physical NAS is configured to register an IP address of the virtual NAS as an IP address of the clone system.

4. The cloud computing system of claim 1, wherein the physical NAS is configured to request, when an error occurs while an original file is being accessed, a backup file of the original file having the error from the virtual NAS, receive the requested backup file, and recover the original file having the error by using the received backup file.

5. The cloud computing system of claim 1, wherein the virtual NAS is configured to request, when an error occurs while a backup file is being accessed, an original file corresponding to the backup file having the error from the physical NAS, receive the original file, and recover the backup file having the error by using the received original file.

6. A data synchronization method performed by the cloud computing system including a plurality of Small Medium Business (SMB) network systems and a cloud hosting and storage system, each of the SMB network systems including a plurality of client terminals and a physical network attached storage (NAS) storing a plurality of original files accessible by one of the plurality of client terminals, the method comprising:

requesting, by the physical NAS, a cloud hosting service through an internet;

generating, by the cloud hosting and storage system, a virtual NAS corresponding to the physical NAS in accordance with the requesting for the cloud hosting service;

allocating, by the cloud hosting and storage system, a virtual storage space for backing up the plurality of original files stored in the physical NAS to the virtual NAS; and performing, by the cloud hosting and storage system, data synchronization between the physical NAS and the virtual NAS by backing up the plurality of original files stored in the physical NAS to the virtual storage space of the virtual NAS through the internet, wherein the physical NAS stores first identification information for identifying and authenticating members registered in the SMB network systems, and transmits the first identification information to the cloud hosting and storage system, wherein the cloud hosting and storage system receives the first identification information from the SMB network systems, generate second identification information which is identical to the first identification information, based on the received first identification information, and store the generated second identification information, wherein the cloud hosting and storage system authenticates one of the members trying to access, by using a mobile terminal through the internet, the virtual NAS outside the SMB network systems with the second identification information, wherein, when one of the original files stored in the physical NAS is changed, the physical NAS transmits the changed original file to the virtual NAS, and wherein, when one of a plurality of backup files in the virtual storage space of the virtual NAS is changed by the accessed mobile terminal of the authenticated member, the virtual NAS synchronizes the plurality of original files stored in the physical NAS with the changed backup file by transmitting the changed backup file to the physical NAS.

7. The method of claim 6, wherein the data synchronization comprises:

sequentially comparing the plurality of original files stored in the physical NAS with the plurality of backup files stored in the virtual storage space of the virtual NAS in accordance with a file hierarchical structure; and replacing, when the plurality of backup files are different from the original files, the plurality of backup files with the original files.

8. The method of claim 6, wherein the data synchronization comprises:

registering, when the plurality of original files in the physical NAS are changed, the changed files to a list of changed files; and replacing the plurality of backup files in the virtual NAS which correspond to the files registered to the list of the changed files with the changed files.

9. The method of claim 6, wherein the data synchronization comprises:

requesting, when an error occurs while an original file is being accessed in the physical NAS, the corresponding backup file from the virtual NAS, and recovering the original file having the error in the physical NAS with the corresponding backup file received from the virtual NAS; and requesting, when an error occurs while a backup file is being accessed in the virtual NAS, the corresponding original file from the physical NAS, and recovering the backup file having the error in the virtual NAS with the corresponding original file received from the physical NAS.

10. A cloud computing system comprising:

a plurality of Small Medium Business (SMB) network systems, wherein each of the SMB network systems includes a physical network attached storage (NAS) having a shared storage region that is configured to store a plurality of original files accessible by a plurality of client terminals through an intranet; and a cloud storage system configured to receive information on the shared storage region through an internet and allocate a virtual storage space in a cloud storage corresponding to the received information on the shared storage region, wherein the physical NAS is configured to store first identification information for identifying and authenticating members registered in the SMB network systems, and transmit the first identification information to the cloud hosting and storage system, wherein the cloud hosting and storage system is configured to receive the first identification information from the SMB network systems, generate second identification information which is identical to the first identification information, based on the received first identification information, and store the generated second identification information, and wherein the cloud storage system is configured to authenticate one of the members trying to access, by using a mobile terminal through the internet, the virtual NAS outside the SMB network systems with the second identification information, wherein the physical NAS is configured to transmit, when at least one of the plurality of original files stored in the physical NAS is changed, the changed original file to the virtual NAS, and wherein the virtual NAS is configured to synchronize, when one of a plurality of backup files in the virtual storage space of the virtual NAS is changed by the accessed mobile terminal of the authenticated member, the plurality of original files stored in the physical NAS with the changed backup file by transmitting the changed backup file to the physical NAS through the internet.

11. The cloud computing system of claim 10, wherein the cloud storage system allocates the virtual storage space in the cloud storage corresponding to the received information of the shared storage region, and synchronizes, when the plurality of original files stored in the shared storage region or the plurality of backup files stored in the virtual storage space are changed, the plurality of original files stored in the shared storage region and the plurality of backup files stored in the virtual storage space.

12. The cloud computing system of claim 10, wherein the plurality of client terminals comprise a client sub-terminal configured to access the cloud storage through the internet and to change the one of the plurality of backup files stored in the virtual storage space of the cloud storage, and wherein the cloud storage system provides, when a request for access to the one of the plurality of backup files stored in the virtual storage space is received from the client sub-terminal, the requested backup file.

13. The cloud computing system of claim 10, wherein the cloud storage system searches, in the virtual storage space, for a first backup file corresponding to a first original file having an error upon a request for the first backup file from the physical NAS, and provides the searched first backup file to the physical NAS, and wherein the cloud storage system receives, when an error occurs while a second backup file is being accessed by one of the plurality of client terminals, a second original file corresponding to the second backup file from the physical NAS, and provides the received second original file to the client terminal.

* * * * *